(12) United States Patent
Oksala

(10) Patent No.: US 6,477,151 B1
(45) Date of Patent: Nov. 5, 2002

(54) PACKET RADIO TELEPHONE SERVICES

(75) Inventor: Jarkko Oksala, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/189,590

(22) Filed: Nov. 10, 1998

(30) Foreign Application Priority Data

Nov. 11, 1997 (FI) .................................................. 974200
Nov. 21, 1997 (FI) .................................................. 974290

(51) Int. Cl.$^7$ ................................................. H04Q 7/00
(52) U.S. Cl. ........................ 370/314; 370/324; 370/347; 370/350; 370/508; 370/509
(58) Field of Search ................................ 370/277, 278, 370/280, 282, 313, 314, 328, 329, 330, 336, 337, 345, 347, 350, 442, 503, 508, 509, 324, 312

(56) References Cited

U.S. PATENT DOCUMENTS

| | | | |
|---|---|---|---|
| 5,257,257 A | | 10/1993 | Chen et al. .................... 370/18 |
| 5,640,395 A | | 6/1997 | Hamalainen et al. ....... 370/322 |
| 5,729,534 A | | 3/1998 | Jokinen et al. .............. 370/280 |
| 5,729,541 A | | 3/1998 | Hamalainen et al. ....... 370/337 |
| 5,790,534 A | | 8/1998 | Kokko et al. ................ 370/335 |
| 5,802,465 A | | 9/1998 | Hamalainen et al. ....... 455/403 |
| 5,974,106 A | * | 10/1999 | Dupont et al. .............. 375/377 |
| 5,987,137 A | * | 11/1999 | Karppanen et al. .......... 380/28 |
| 6,031,832 A | * | 2/2000 | Turina ........................ 370/348 |
| 6,052,594 A | * | 4/2000 | Chuang et al. .............. 455/450 |
| 6,072,792 A | * | 6/2000 | Mazur et al. ................ 370/345 |

FOREIGN PATENT DOCUMENTS

| | | |
|---|---|---|
| FI | 91699 | 4/1994 |
| FI | 98426 | 2/1997 |
| FI | 98427 | 2/1997 |
| WO | WO 94/05094 | 3/1994 |
| WO | WO 96/33586 | 10/1996 |

OTHER PUBLICATIONS

"Digital cellular telecommunications system (Phase 2+); General Packet Radio Service(GPRS); Service description"; Stage 2 (GSM 03.60 version 6.1.1 Release 1997).
Finnish Office Action.

* cited by examiner

Primary Examiner—Hassan Kizou
Assistant Examiner—Ahmed Elallam
(74) Attorney, Agent, or Firm—Perman & Green, LLP

(57) ABSTRACT

A method of synchronising radio signal transmission slots at a mobile station to radio signal reception slots at a base station subsystem to account for a propagation delay between the mobile station and the base station subsystem. The method is applicable to a GPRS packet switched cellular telephone network in which a downlink channel is defined for transmitting user data from the base station subsystem to the mobile station and an uplink channel is defined for transmitting user data from the mobile station to the base station subsystem. These channels comprise dynamically allocated time slots in a time division multiple access frame. An updated timing advance value indicative of the radio propagation delay between the mobile station and the base station subsystem at a given time is calculated at the base station once every 8 multiframes. The timing advance value is identified to the mobile station by a timing advance index previously allocated to the mobile station. The mobile station uses the timing advance value to advance transmission slots at the mobile station for both the uplink and downlink channels so that transmitted data is received at the base station subsystem in the allocated base station subsystem reception slots.

14 Claims, 4 Drawing Sheets

| n   | B0 | B1 | B2 | 0  | B3 | B4 | B5 | 1  | B6 | B7 | B8 | 2  | B9 | B10 | B11 | 3  |
| n+1 | B0 | B1 | B2 | 4  | B3 | B4 | B5 | 5  | B6 | B7 | B8 | 6  | B9 | B10 | B11 | 7  |
| n+2 | B0 | B1 | B2 | 8  | B3 | B4 | B5 | 9  | B6 | B7 | B8 | 10 | B9 | B10 | B11 | 11 |
| n+3 | B0 | B1 | B2 | 12 | B3 | B4 | B5 | 13 | B6 | B7 | B8 | 14 | B9 | B10 | B11 | 15 |
| n+4 | B0 | B1 | B2 | 16 | B3 | B4 | B5 | 17 | B6 | B7 | B8 | 18 | B9 | B10 | B11 | 19 |
| n+5 | B0 | B1 | B2 | 20 | B3 | B4 | B5 | 21 | B6 | B7 | B8 | 22 | B9 | B10 | B11 | 23 |
| n+6 | B0 | B1 | B2 | 24 | B3 | B4 | B5 | 25 | B6 | B7 | B8 | 26 | B9 | B10 | B11 | 27 |
| n+7 | B0 | B1 | B2 | 28 | B3 | B4 | B5 | 29 | B6 | B7 | B8 | 30 | B9 | B10 | B11 | 31 |

PACKET RADIO TELEPHONE SERVICES

FIELD OF THE INVENTION

The present invention relates to packet switched radio telephone services and is applicable in particular, though not necessarily, to the General Packet Radio Service (GPRS).

BACKGROUND OF THE INVENTION

Current digital cellular telephone systems such as GSM (Global System for Mobile communications) were designed with an emphasis on voice communications. Data is normally transmitted between a mobile station (MS) and a base station subsystem (BSS) over the air interface using the so called "circuit switched" transmission mode in which a series of regularly spaced time slots on one frequency band are reserved for the duration of the call. For voice communications, where the stream of information to be transmitted is relatively continuous, the circuit switched transmission mode is reasonably efficient. However, during data calls, e.g., internet access or facsimile transmission, the data stream is "bursty" and the long term reservation of time slots in the circuit switched mode represents an uneconomic use of the air interface.

Given that the demand for data services with digital cellular telephone systems is increasing rapidly, a new GSM based service known as the General Packet Radio Service (GPRS) is currently being standardised by the European Telecommunications Standards Institute (ETSI) and is defined in overall terms in recommendation GSM 03.60. GPRS provides for the dynamic allocation of transmission capacity for data transmission. That is to say that time slots on a frequency band (or bands) are allocated to a particular MS to BSS link only when there is data to be transmitted. The unnecessary reservation of time slots when there is no data to be transmitted is avoided.

GPRS is intended to operate in conjunction with conventional GSM circuit switched transmission to efficiently use the air interface for both data and voice communications. GPRS will therefore uses a basic channel structure similar to that defined for GSM. In GPRS, a given frequency band is divided in the time domain into multi-frames, each multi-frame consisting in turn of 52 TDMA (Time Division Multiple Access) frames. The length of a TDMA frame is 4.61 5 ms and each TDMA frame is in turn divided into eight consecutive slots of equal duration. This frame structure is illustrated in FIG. 1 and is relative to the transmission and reception time at the BSS. p In the conventional circuit switched transmission mode, when a call is initiated, two physical channels are defined for that call at the BSS by reserving two respective time slots, separated by two intervening slots, in each of a succession of TDMA frames. One of these channels provides a downlink channel for carrying user data from the BSS to the MS whilst the other provides the uplink channel for carrying user data from the MS to the BSS.

With the introduction of GPRS (the general architecture of a GSM/GPRS network is illustrated in FIG. 2) the fixed relationship between time slots allocated for uplink and downlink channels no longer applies. Time slots may be dynamically assigned to the uplink channel and the downlink channel for a given MS depending upon demand and capacity and MS multi-slot class. So, for example, in any given TDMA frame one time slot may be allocated to the downlink channel with two slots being allocated to the uplink channel. Also, there is no fixed time relationship between the uplink and the downlink allocated slots. Slot allocation is notified to the MS during a channel set-up stage.

When a MS first connects to a GPRS cellular network, the MS synchronises itself to the BSS using information carried by a synchronisation channel (SCH) transmitted by the BSS to all listening MSs. Synchronisation involves the initialisation of a modulo counter at the MS which has a 52 TDMA frame cycle. When a user data transmission channel (either uplink or downlink or both) is requested, the BSS allocates time slots for user data and notifies the MS of the allocation. Time slots are allocated in consecutive TDMA frames and may be reserved for a fixed number of frames or until the MS or the BSS chooses to release the channel. For data transmissions from the BSS to the MS, the transmission slots coincide with those defined by the modulo counter and the MS therefore knows when to "listen" for its allocated slots.

The correct synchronisation of the receiver at a MS is therefore easily achieved using the BSS broadcast synchronisation channel. Synchronisation of the transmitter of a MS is however somewhat more complex. As data transmitted from the MS ($MS_{TX}$) to the BSS must arrive at the BSS in the allocated time slot ($BSS_{RX}$), it is necessary to advance the transmission of data (by a timing advance value TAV relative to the time defined by the modulo counter) to take account of the propagation delay from the MS to the BSS (as illustrated in FIG. 3 where slot number 2 is reserved to the MS for transmission). Moreover, as the MS may be moving rapidly relative to the BSS, it is necessary to recalculate the propagation delay at regular intervals and to provide the updated values to the MS.

It will be clear that a TAV is required when an uplink channel is established for transmitting user data from the MS to the BSS. However, a TAV is also required when a downlink channel is established as, even though user data is coming from the BSS to the MS, certain signalling data (e.g. acknowledgements) is going in the reverse direction (i.e. the uplink direction).

In the current GPRS recommendation, a MS transmits a "timing access burst" to the BSS on an uplink Packet Timing Advance Control Channel (PTCCH) channel once every eight multiframes. One access burst is transmitted for each channel allocated to the MS (uplink and downlink). The timing access burst is transmitted in a slot allocated to the MS for this purpose. This transmission is not advanced and so the BSS is able to determine the TAV by determining the time shift in the access burst relative to the time base of the BSS. The TAV for each channel allocated to a MS is transmitted to the MS (on a downlink PTCCH) and is updated once every eight multiframes, i.e. following receipt of each new corresponding timing access burst. This process is illustrated schematically in FIG. 4.

FIG. 5 illustrates eight consecutive multiframes, n to n+7, each of which comprises 52 TDMA frames. The multiframe structure provides 12 radio blocks B0 to B11, each radio block comprising 4 consecutive TDMA frames. The radio blocks are used for transmitting user data (and also some signalling information). In the current GPRS proposal, each slot in a TDMA frame may be simultaneously allocated to up to 16 different downlink channels or to 8 different uplink channels. In the case of a downlink channel, a MS must therefore listen during its allocated slot(s) in each TDMA frame (according to the time base defined by its modulo counter), and decode the received signal to determine if the signal is intended for it.

Each multiframe also contains 4 "idle" TDMA frames (numbered 0 to 31 in the 8 multiframe structure of FIG. 5).

The even numbered idle frames, 0, 2, 4 etc, are used to accommodate timing access bursts transmitted from the MSs to the BSS whilst the odd numbered idle frames, 1, 3, 5 etc, are used to accommodate TAVs transmitted from the BSS to the MSs. Considering the former, one time slot is able to accommodate one timing access burst. Given that 16 channels may be allocated to each time slot, with two idle frames per multiframe allocated for access bursts (e.g. idle frames 0 and 2 in multiframe n), it takes all eight of the multiframes shown in FIG. 5 to convey the maximum possible number of timing access bursts.

Considering the transmission of TAVs from the BSS to the MSs, once calculated, TAVs for the 16 channels (assuming maximum allocation) allocated to a given time slot are coded and transmitted as a split packet. Thus, a packet carrying TAVs for the slot 0 allocated channels is transmitted in the first slot of each of four consecutive idle TDMA frames allocated for TAVs (e.g. idle frames 1,3,5,7). Similarly, the TAVs for the slot 1 allocated channels are transmitted in the second slot of each of these same idle frames, and so on for the slot 2, 3 etc allocated channels.

It will be appreciated that TAVs can be sent for all channels and for all slots in two consecutive multiframes. Before transmitting the next TAV packet in the next two multiframes (e.g. in idle frames 9,11,13,15), the BSS calculates a new TAV for each of the channels for which it received a timing access burst in the preceding two multiframes, i.e. four channels for each slot. These new values are then transmitted together with the 12 "old" TAVs for each slot. Given that a TAV for a given channel is updated only once every eight multiframes, a MS has four opportunities to recover its allocated TAV(s). However, if it receives its TAV(s) correctly in the first transmission, it need not listen to any of the TAV idle frames in the next 6 multiframes.

During a channel set-up stage, the BSS allocates to a MS, one or more slots in the radio block TDMA frames for transmitting or receiving data. The BSS also allocates to the channel a slot number for the idle frames, and a 4-bit timing advance index (TAI). The TAI serves three purposes. Firstly, the TAI identifies that idle frame, of all the idle frames present in the eight multiframe structure, in which the MS must transmit (in the specified time slot) a timing access burst for the corresponding channel. Secondly, it identifies the four idle frame series in which the newly updated TAV for that channel is transmitted—the MS only listening to the remaining idle frames if it does not correctly recover the TAV from the newly updated series. Thirdly, the TAI enables the MS to recover its own TAV(s) from the TAV packet. This TAV recovery procedure is illustrated in FIG. 6.

Assuming that all MSs are involved in bi-directional communication with the BSS, i.e. two channels per MS, the signalling structure outlined above allows 8 MSs to share a single time slot as for any given time slot only 16 access bursts may be sent every 8 multi-frames.

SUMMARY OF THE INVENTION

It is an object of the present invention to increase the number of mobile stations which may use the same time slot in an idle frame for transmitting and receiving timing advance information. This and other objects are met by allocating a single timing advance index to the uplink and downlink channels of a mobile station. Thus, both the uplink and downlink channels will share the same timing advance value for transmissions in the uplink direction and will also make use of a common timing access burst.

According to a first aspect of the present invention there is provided a method of synchronising radio signal transmission slots at a mobile station to radio signal reception slots at a base station subsystem to account for a propagation delay between the mobile station and the base station subsystem, said reception slots corresponding to uplink and/or downlink user data packet switched transmission channels allocated dynamically by the base station subsystem, the method comprising:

at the base station subsystem, allocating to the mobile station a single timing advance index, which index identifies one idle frame in a multiframe structure in which the mobile station should transmit a timing access burst to the base station subsystem and one or more further idle frames in said multiframe structure in which the base station subsystem should transmit an updated timing advance value to the mobile station;

at the base station subsystem, allocating to the mobile station an idle frame slot number, said slot number identifying the time slot in said idle frames when said timing access burst and said timing advance values should be transmitted;

transmitting said timing advance index and said idle frame slot number to the mobile station; and at the mobile station, subsequently using said timing advance index and said idle frame slot number to determine timing advance values for all user data channels allocated to the mobile station.

Embodiments of the present invention provide for the sharing of a single timing advance index between all channels allocated to a single mobile station. This maximises the number of mobile stations which can share a time slot in an idle frame for receiving and transmitting timing advance information, i.e. timing access bursts and timing advance values. The number of slots to which a mobile station must listen for timing advance values, and in which a mobile station must transmit timing access bursts, is also reduced.

In the application of the present invention to GPRS, said multiframe structure consists of 8 multiframes, each multiframe consisting of 52 TDMA frames, and each TDMA frame consisting of 8 time slots.

According to a second aspect of the present invention there is provided a method of synchronising radio signal transmission slots at a mobile station to radio signal reception slots at a base station subsystem to account for a propagation delay between the mobile station and the base station subsystem, the method comprising:

at the base station subsystem, defining a downlink channel for transmitting user data from the base station subsystem to the mobile station and defining an uplink channel for transmitting user data from the mobile station to the base station subsystem, said channels each comprising one or more dynamically allocated time slots in a time division multiple access frame where the time slot(s) allocated to each of the uplink and downlink channels are not necessarily equal in number and do not necessarily having a fixed time relationship;

determining at the base station subsystem a timing advance value indicative of the radio propagation delay between the mobile station and the base station subsystem at a given time;

transmitting the timing advance value once, from the base station subsystem to the mobile station; and using the timing advance value at the mobile station to advance transmission slots at the mobile station for both the uplink and downlink channels so that transmitted data is received at the base station subsystem in the allocated base station subsystem reception slots.

Preferably, said timing advance value is transmitted from the base station subsystem to the mobile station in a data packet, said packet also containing timing advance values associated with other mobile stations communicating with the same base station subsystem. The data packet may be distributed over a plurality of time division multiple access frames.

Preferably, the method comprises updating the timing advance value after predetermined intervals and transmitting the updated value as part of a new data packet containing updated values for the other mobile stations.

Preferably, the method comprises allocating to the uplink and downlink channels, during a channel set-up stage, a common timing advance index, which index allows the mobile station to extract the corresponding timing advance value from said data packet.

According to a third aspect of the present invention there is provided a radio telephone network comprising a base station subsystem and a plurality of mobile stations for communicating with the base station subsystem and in which radio signal transmission slots at a mobile station are synchronised to radio signal reception slots at the base station subsystem to account for a propagation delay between the mobile station and the base station subsystem, said reception slots corresponding to uplink and/or downlink user data packet switched transmission channels allocated dynamically by the base station subsystem, the base station subsystem comprising:

first allocation means for allocating to a mobile station a single timing advance index, which index identifies one idle frame in a multiframe structure in which the mobile station should transmit a timing access burst to the base station subsystem and one or more further idle frames in said multiframe structure in which the base station subsystem should transmit an updated timing advance value to the mobile station;

second allocating means for allocating to a mobile station an idle frame slot number, said slot number identifying the time slot in said idle frames when said timing access burst and said timing advance values should be transmitted; and transmitting means for transmitting said timing advance index and said idle frame slot number to the mobile station, the mobile stations each comprising transmitting means for using said timing advance index and said idle frame slot number to determine timing advance values for all user data channels allocated to the mobile station.

According to a fourth aspect of the present invention there is provided a radio telephone network comprising a base station subsystem and a plurality of mobile stations for communicating with the base station subsystem, the base station subsystem comprising:

channel allocation means for defining a downlink channel for transmitting user data from the base station subsystem to the mobile station and for defining an uplink channel for transmitting user data from the mobile station to the base station subsystem, said channels each comprising one or more dynamically allocated time slots in a time division multiple access frame where the time slot(s) allocated to each of the uplink and downlink channels are not necessarily equal in number and do not necessarily having a fixed time relationship;

measuring means for determining a timing advance value indicative of the radio propagation delay between the mobile station and the base station subsystem at a given time; and transmission means for transmitting the timing advance value once, from the base station subsystem to the mobile station, the mobile station comprising radio transmission control means for advancing transmission slots at the mobile station for both the uplink and downlink channels using the received timing advance value so that transmitted data is received at the base station subsystem in the allocated base station subsystem reception slots.

According to a fifth aspect of the present invention there is provided a base station subsystem for use in the radio telephone network of the above third or fourth aspect of the present invention.

According to a sixth aspect of the present invention there is provided a mobile station for use in the radio telephone network of the above third or fourth aspect of the present invention.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION

Figure 1:
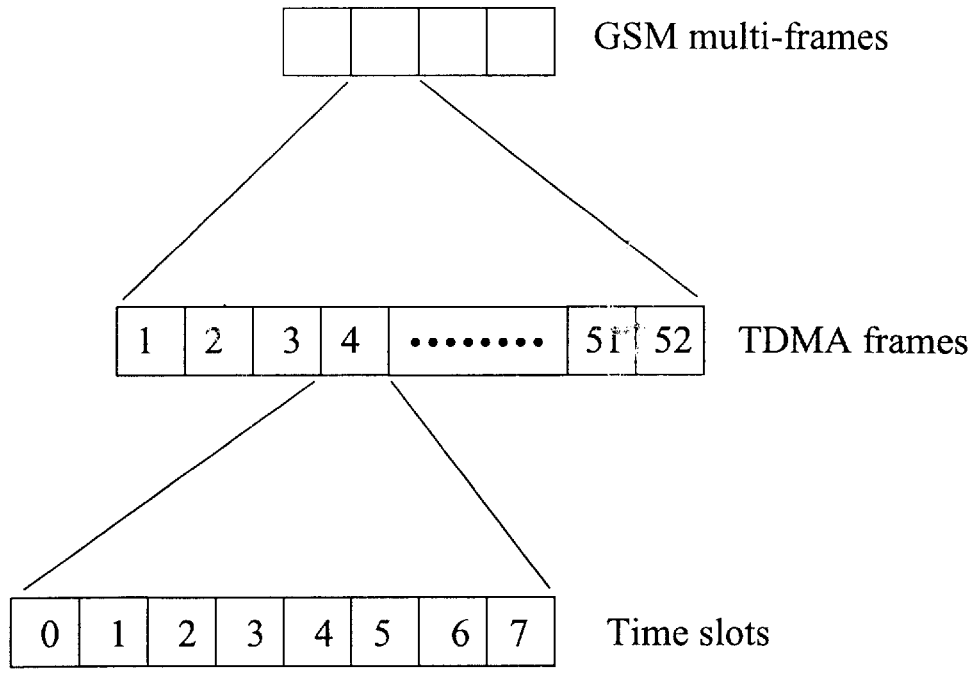
FIG. 1 shows the division of a GPRS multi-frame into 52 TDMA frames and the division of a TDMA frame into eight time slots.
Figure 3:
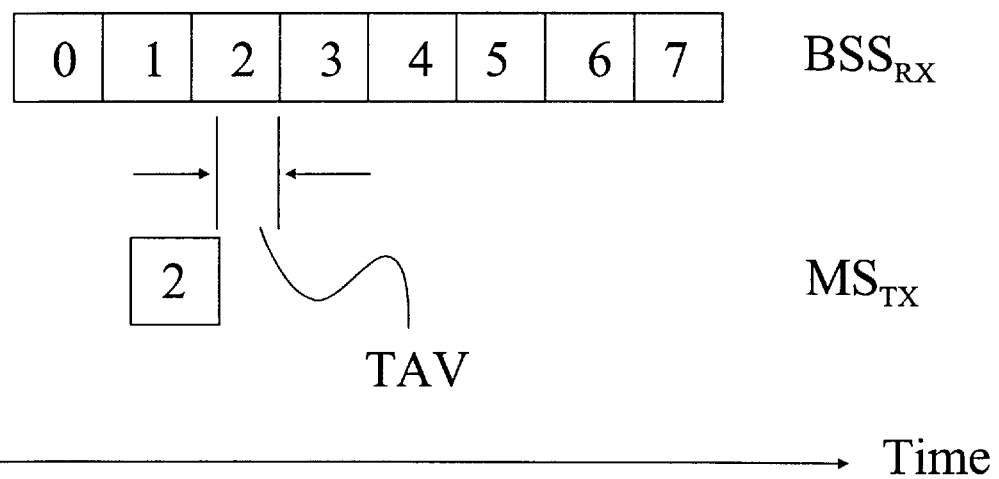
FIG. 3 illustrates the timing advance applied to transmissions from a mobile station.
Figure 2:
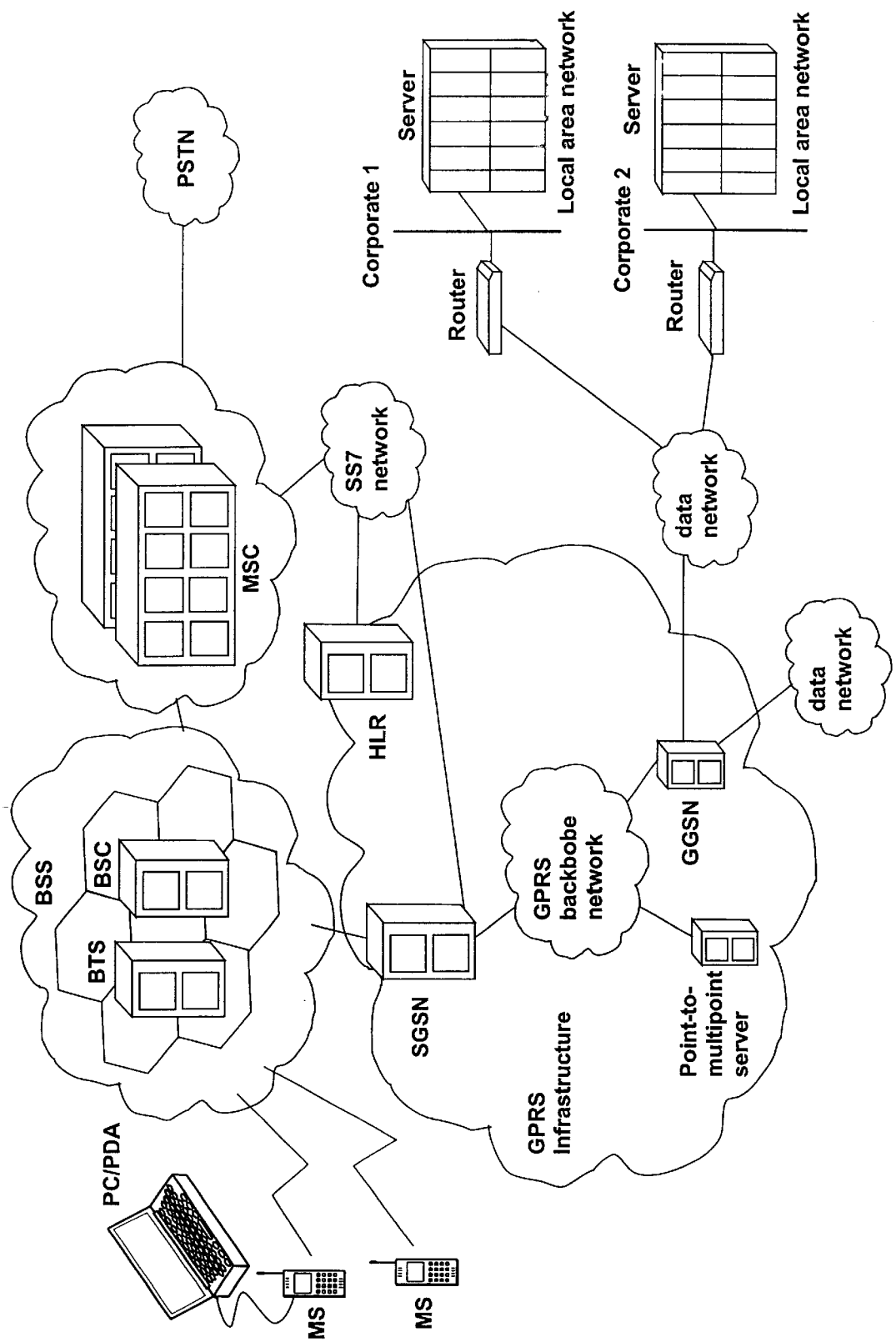
FIG. 2 shows schematically the architecture of a GSM/GPRS digital cellular telephone network.
Figures 4, 5:
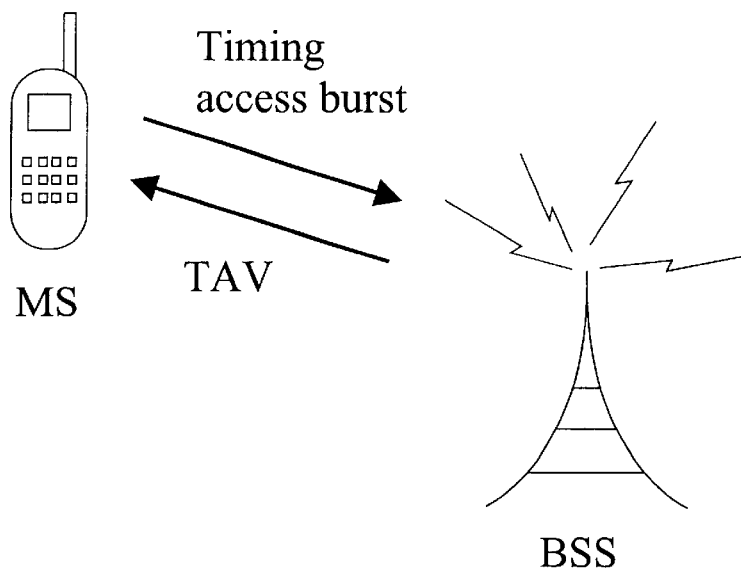
FIG. 4 illustrates the exchange of timing advance information between a mobile station and a base station subsystem.
FIG. 5 illustrates the multiframe structure used in GPRS.
Figure 6:
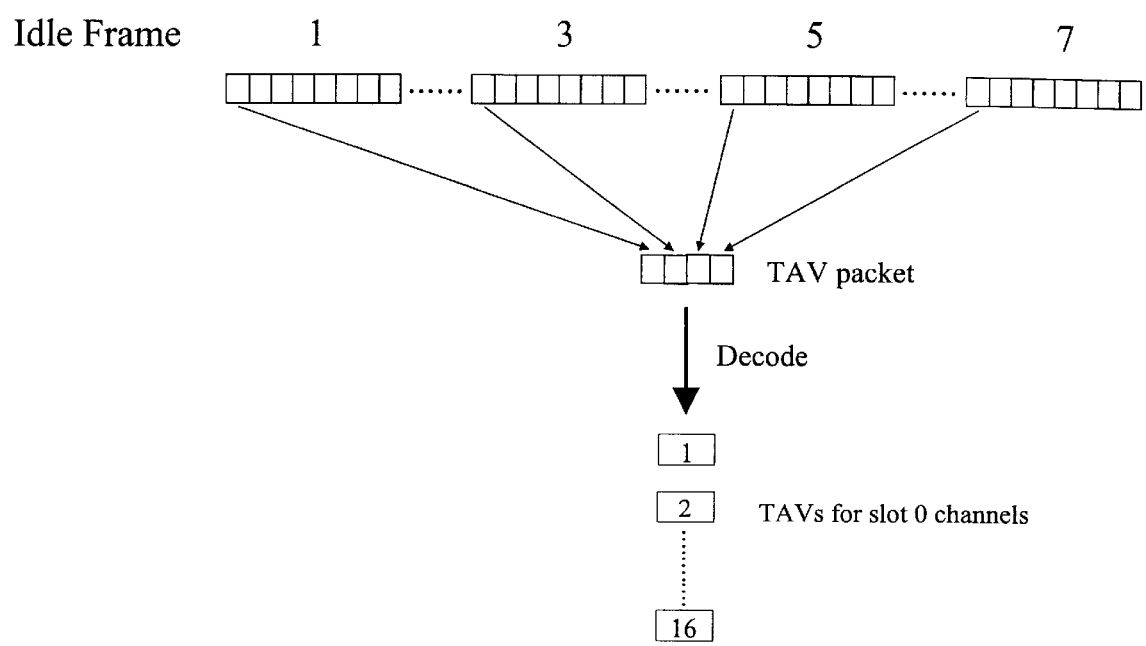
FIG. 6 illustrates a TAV data packet carrying timing advance values for a number of mobile stations.

As has been described above, and according to current proposals, when either a mobile station (MS) or a base station subsystem (BSS) in a cellular telephone network requests GPRS communication between the MS and the BSS, either a downlink channel (user data transmission from the BSS to the MS) or an uplink channel (user data transmission from the MS to the BSS) or both (bidirectional communication), are defined by the BSS. This involves allocating specific time slots within a series of TDMA frames (making up the radio blocks) to the defined channel (s) and notifying the MS of the allocation by transmitting specific resource assignment messages to the MS.

In the embodiment of the present invention described here, regardless of how many user data channels are to be defined between the MS and the BSS, each MS is allocated only a single timing advance index (TAI) and a single idle frame slot number. The TAI performs exactly the same function as that of the TAI defined for the existing GPRS proposal, i.e. it identifies one idle frame in the multiframe structure where the MS should transmit its timing access burst, it identifies the four idle frame sequence in which the newly updated TAV for the MS is transmitted, and it allows the MS to decode the TAV packet to recover the TAV for the MS. Similarly, the idle frame slot number allocated to the MS identifies the slot in the idle frames where the timing access burst for the MS should be transmitted and in which the TAV packet is transmitted. However, the timing access burst and the TAV are common to all channels allocated to the MS. There is no need to repeat the transmission of timing advance information for all channels as the same timing advance value can be used for all uplink transmissions (associated with both uplink and downlink channels).

It will be appreciated that modifications may be made to the above described embodiment without departing from the scope of the present invention.

| | |
|---|---|
| BSC | Base Station Controller |
| BSS | Base Station Subsystem |
| BTS | Base Transceiver Station |
| GGSN | Gateway GPRS Support Node |
| GPRS | General Packet Radio Service |
| GSM | Global System for Mobile Communications |
| HLR | Home Location Register |
| MS | Mobile Station |
| MSC | Mobile Switching Center |
| PC/PDA | Personal Computer/Personal Data Assistant |
| PSTN | Public-Switched Telephone Network |
| SGSN | Serving GPRS Support Node |
| SS7 | Signalling System number 7 |
| TDMA | Time Division Multiple Access |
| UMTS | Universal Mobile Telecommunications Service |

What is claimed is:

1. A method of synchronising radio signal transmission slots at a mobile station to radio signal reception slots at a base station subsystem to account for a propagation delay between the mobile station and the base station subsystem, said reception slots corresponding to uplink and/or downlink user data packet switched transmission channels allocated dynamically by the base station subsystem, the method comprising:

at the base station subsystem, allocating to the mobile station a single timing advance index, which index identifies one idle frame in a multiframe structure in which the mobile station should transmit a timing access burst to the base station subsystem and one or more further idle frames in said multiframe structure in which the base station subsystem should transmit an updated timing advance value to the mobile station;

at the base station subsystem, allocating to the mobile station an idle frame slot number, said slot number identifying the time slot in said idle frames when said timing access burst and said timing advance values should be transmitted;

transmitting said timing advance index and said idle frame slot number to the mobile station; and at the mobile station, subsequently using said timing advance index and said idle frame slot number to determine timing advance values for all user data channels allocated to the mobile station.

2. A method according to claim 1, wherein the method forms part of a General Packet Radio Service and said multiframe structure consists of 8 multiframes, each multiframe consisting of 52 TDMA frames, and each TDMA frame consisting of 8 time slots.

3. A method according to claim 1, wherein said timing advance value is transmitted from the base station subsystem to the mobile station in a data packet, said packet also containing timing advance values associated with other mobile stations communicating with the same base station subsystem.

4. A method according to claim 2, wherein said timing advance value is transmitted from the base station subsystem to the mobile station in a data packet, said packet also containing timing advance values associated with other mobile stations communicating with the same base station subsystem, and wherein said data packet is split between four time slots, one slot in each of four idle frames in a the multiframe structure, and said slots corresponding to said idle frame slot number assigned to the mobile station.

5. A method according to claim 1, and comprising updating said timing advance value once in every multiframe structure, following receipt by the base station subsystem of said timing access burst.

6. A radio telephone network comprising a base station subsystem and a plurality of mobile stations for communicating with the base station subsystem and in which radio signal transmission slots at a mobile station are synchronised to radio signal reception slots at the base station subsystem to account for a propagation delay between the mobile station and the base station subsystem, said reception slots corresponding to uplink and/or downlink user data packet switched transmission channels allocated dynamically by the base station subsystem, the base station subsystem being configured to:

allocate to a mobile station a single timing advance index, which index identifies one idle frame in a multiframe structure in which the mobile station should transmit a timing access burst to the base station subsystem and one or more further idle frames in said multiframe structure in which the base station subsystem should transmit an updated timing advance value to the mobile station;

allocate to a mobile station an idle frame slot number, said slot number identifying the time slot in said idle frames when said timing access burst and said timing advance values should be transmitted; and transmit said timing advance index and said idle frame slot number to the mobile station, and the mobile stations each comprising being configured to use said timing advance index and said idle frame slot number to determine timing advance values for all user data channels allocated to the mobile station.

7. A base station subsystem for use in a radio telephone network, said radio telephone network comprising a base station subsystem and a plurality of mobile stations for communicating with the base station subsystem and in which radio signal transmission slots at a mobile station are synchronised to radio signal reception slots at the base station subsystem to account for a propagation delay between the mobile station and the base station subsystem, said reception slots corresponding to uplink and/or downlink user data packet switched transmission channels allocated dynamically by the base station subsystem, the base station subsystem being configured to:

allocating to a mobile station a single timing advance index, which index identifies one idle frame in a multiframe structure in which the mobile station should transmit a timing access burst to the base station subsystem and one or more further idle frames in said multiframe structure in which the base station subsystem should transmit an updated timing advance value to the mobile station;

allocate to a mobile station an idle frame slot number, said slot number identifying the time slot in said idle frames when said timing access burst and said timing advance values should be transmitted; and transmit said timing advance index and said idle frame slot number to the mobile station.

8. A method of synchronizing radio signal transmission slots at a mobile station to radio signal reception slots at a base station subsystem to account for a propagation delay between the mobile station and the base station subsystem, the method comprising the steps of:

at the base station subsystem, defining a downlink channel for transmitting user data from the base station subsystem to the mobile station and defining an uplink channel for transmitting user data from the mobile station to the base station subsystem, the downlink channel and the uplink channel each comprising one or more dynamically allocated time slots in a time division multiple access frame where the time slot(s) allocated to each of the uplink and downlink channels are not necessarily equal in number and do not necessarily have a fixed time relationship;

determining at the base station subsystem a timing advance value indicative of the radio propagation delay between the mobile station and the base station subsystem at a given time;

transmitting the timing advance value once, from the base station subsystem to the mobile station; and using the timing advance value at the mobile station to advance transmission slots at the mobile station for both the uplink and downlink channels so that transmitted data is received at the base station subsystem in the allocated base station subsystem reception slots.

9. A method according to claim 8, wherein the timing advance value is transmitted from the base station subsystem to the mobile station in a data packet, the packet also containing timing advance values associated with other mobile stations communicating with the same base station subsystem.

10. A method according to claim 9, further comprising the step of updating the timing advance value after predetermined intervals and transmitting the updated value as part of a new data packet containing updated values for the other mobile stations.

11. A method according to claim 10, further comprising the step of allocating to the uplink and downlink channels, during a channel set-up stage, a common timing advance index, which index allows the mobile station to extract a corresponding timing advance value from the data packet.

12. A radio telephone network comprising a base station subsystem and a plurality of mobile stations for communicating with the base station system, the base station subsystem being configured to:

define a downlink channel for transmitting user data from the base station subsystem to the mobile station and for defining an uplink channel for transmitting user data from the mobile station to the base station subsystem, the downlink channel and uplink channel each comprising one or more dynamically allocated time slots in a time division multiple access frame where the time slot(s) allocated to each of the uplink and downlink channels are not necessarily equal in number and do not necessarily have a fixed time relationship;

determine a timing advance value indicative of the radio propagation delay between the mobile station and the base station subsystem at a given time; and transmit the timing advance value once, from the base station subsystem to the mobile station, and wherein the mobile station is configured to advance transmission slots at the mobile station for both the uplink and downlink channels using the received timing advance value so that transmitted data is received at the base station subsystem in the allocated base station subsystem reception slots.

13. A mobile station for use in a radio telephone network, the radio telephone network comprising a base station subsystem and a plurality of mobile stations for communicating with the base station subsystem and in which radio signal transmission slots at a mobile station are synchronised to radio signal reception slots at the base station subsystem to account for a propagation delay between the mobile station and the base station subsystem, the reception slots corresponding to uplink and/or downlink user data packet switched transmission channels allocated dynamically by the base station subsystem, the mobile station being configured to receive:

a single timing advance index allocated to the mobile station at the base station subsystem, which index identifies one idle frame in a multiframe structure in which the mobile station should transmit a timing access burst to the base station subsystem and one or more further idle frames in the multiframe structure in which the mobile station should receive an updated timing advance value;

the one or more further idle frames in the multiframe structure identified by the timing advance index;

an idle frame slot number, which is allocated to the mobile station at the base station subsystem, identifying the time slot in the idle frames when the timing access burst and the timing advance values should be transmitted;

the updated timing advance value in the further one or more idle frames, and the mobile station further being configured to transmit; and data using the timing advance index and the idle frame slot number to determine timing advance values for all user data channels allocated to the mobile station.

14. A mobile station for use in a radio telephone network, the radio telephone network comprising a base station subsystem and a plurality of mobile stations for communicating with the base station subsystem and in which radio signal transmission slots at a mobile station are synchronised to radio signal reception slots at the base station subsystem to account for a propagation delay between the mobile station and the base station subsystem, the reception slots corresponding to uplink and/or downlink user data packet switched transmission channels allocated dynamically by the base station subsystem, the mobile station being configured to:

receive a timing advance value once, from the base station subsystem to the mobile station, and to;

advance transmission slots at the mobile station for both the uplink and downlink channels using the received timing advance value so that transmitted data is received at the base station subsystem in the allocated base station subsystem reception slots.

* * * * *